United States Patent
Hagerty

(10) Patent No.: US 7,177,232 B1
(45) Date of Patent: Feb. 13, 2007

(54) WIRELESS RADIO FREQUENCY HYDROPHONE SYSTEM

(75) Inventor: James D. Hagerty, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 204 days.

(21) Appl. No.: 11/086,727

(22) Filed: Mar. 21, 2005

(51) Int. Cl.
*G01V 1/00* (2006.01)

(52) U.S. Cl. .......................................... 367/77; 367/63

(58) Field of Classification Search .................. 367/3, 367/63, 67, 77
See application file for complete search history.

(56) References Cited

U.S. PATENT DOCUMENTS 4,309,763 A * 1/1982 Passmore et al. ............. 367/77
4,639,900 A * 1/1987 Gustafson ....................... 367/3
6,219,620 B1 * 4/2001 Park et al. ..................... 702/14

* cited by examiner

Primary Examiner—Ian J. Lobo
(74) Attorney, Agent, or Firm—James M. Kasischke; Jean-Paul A. Nasser; Michael P. Stanley

(57) ABSTRACT

A wireless hydrophone system includes a hydrophone joined to a preamplifier. A serial A/D converter receives the amplified hydrophone signal and provides a serial digital output representative of the signal. The A/D converter is joined to a processor which provides a start signal and a clock signal to the A/D converter. A digital transmitter is also controlled by the processor. The transmitter receives the serial digital output from the A/D converter for wireless transmission over an antenna. The system can also include logic for allowing the processor to provide an extended sync signal for transmission. The extended sync signal can alert a receiver to an initial transmission. The system can be incorporated in a hull treatment for positioning on a vessel's hull.

10 Claims, 2 Drawing Sheets

WIRELESS RADIO FREQUENCY HYDROPHONE SYSTEM

STATEMENT OF GOVERNMENT INTEREST

The invention described herein may be manufactured and used by or for the Government of the United States of America for governmental purposes without the payment of any royalties thereon or there for.

CROSS-REFERENCE TO RELATED PATENT APPLICATIONS

This patent application is co-pending with one related patent applications entitled Wireless Serial Data Transmission Method and Apparatus Ser. No. 11/086,737 by the same inventor as this application.

BACKGROUND OF THE INVENTION (1) Field of the Invention

This invention relates to a hydrophone system that can communicate wirelessly with a receiver. More specifically the invention relates to a wireless hydrophone that produces a digitally-modulated, radio-frequency signal containing telemetry information. The invention is specifically adapted for use on vessels.

(2) Description of the Prior Art

It is desirable to have a large number of hydrophones positioned on a submarine in order to increase aperture size and provide greater detail in acoustic imaging. Under current technology, hydrophones used in sonar systems are deployed on submarines in select locations. These locations must have exposure to the aquatic environment, and the hydrophones must have a communication path to the interior of the submarine. Additionally, hydrophones must be positioned in an environment having low flow noise and engine noise. In view of these criteria, hydrophone arrays are limited in size and location.

In order to overcome these limitations, it has been proposed that sensors be incorporated outside the hull of the submarine. The use of wireless communication with these sensors acts to minimize the number of hull penetrations required to provide a communication path to the interior of the submarine. These sensors must also have limited power consumption to allow for long battery life or even the possibility of wireless power transmission. In the latter, power transmission efficiencies tend to be low, mandating the very lowest power consumption for the sensor and its associated electronics.

In the underwater environment, the need for wireless hydrophones has been accelerated by the interest in smart-skin type embedded sensors on the hulls of Navy platforms. Such sensors are placed in large numbers on the platform skin surface, and the data from those sensors may be transmitted wirelessly to receivers located inside or underlying the "skin" structure.

The prior art discloses wireless digital microphones for use in security systems and the like. These systems are not specifically adapted to underwater use. In an aquatic environment, radio waves do not carry for a significant distance unless extremely low frequency waves are used. Extremely low frequency waves do not support the high data transfer rates required for sonar systems. Hydrophones differ from microphones in that they are constructed to withstand high pressure environments under water at depth. Because of this construction, hydrophones are highly capacitive, and the output signal requires special conditioning before preamplification. Accordingly, wireless microphones are not readily adaptable to underwater use.

SUMMARY OF THE INVENTION

This invention provides a wireless hydrophone system which includes a hydrophone joined to a preamplifier. A serial A/D converter receives the amplified hydrophone signal and provides a serial digital output representative of the signal. The A/D converter is joined to a processor which provides a start signal and a clock signal to the A/D converter. A digital transmitter is also controlled by the processor. The transmitter receives the serial digital output from the A/D converter for wireless transmission over an antenna. The system can also include logic for allowing the processor to provide an extended sync signal for transmission. The extended sync signal can alert a receiver to an initial transmission. The system can be incorporated in a hull treatment for positioning on a vessel's hull.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
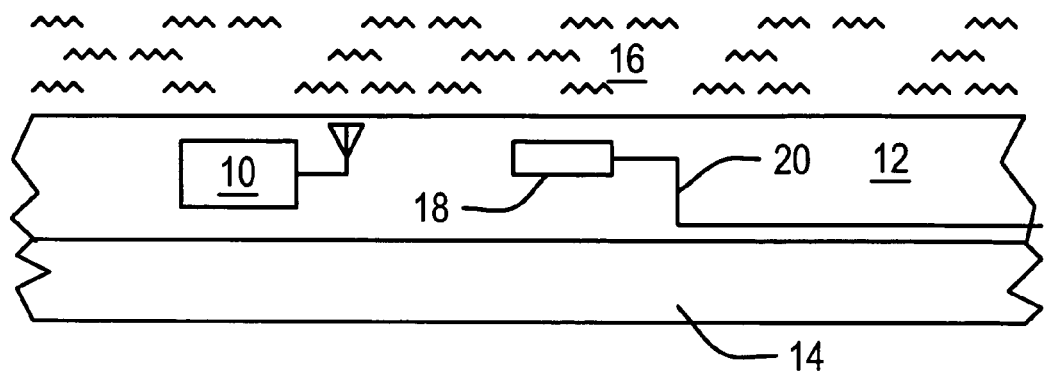
FIG. 1 is a diagram showing the wireless hydrophone of the current invention.

In FIG. 1, there is shown a diagram of a wireless hydrophone 10 positioned within a hull treatment 12 on a vessel's hull 14. It is anticipated that in operation the wireless hydrophone 10 will be positioned beneath the surface of water 16 for receiving acoustic signals. Hull treatment 12 is preferably made from a dielectric material such as polyurethane or some other polymer material allowing radio communication there through over distances of around 2 meters. Wireless hydrophone 10 can be in radio communication with a radiator 18 also positioned within hull treatment 12. Radiator 18 can communicate with multiple wireless devices. Radiator 18 is joined to a communication line 20 for communicating with electronics inside vessel. The arrangement shown allows positioning of wireless hydrophone 10 anywhere on vessel's hull 14 while minimizing the number of communication lines 20 penetrating vessel's hull 14.

Figure 2:
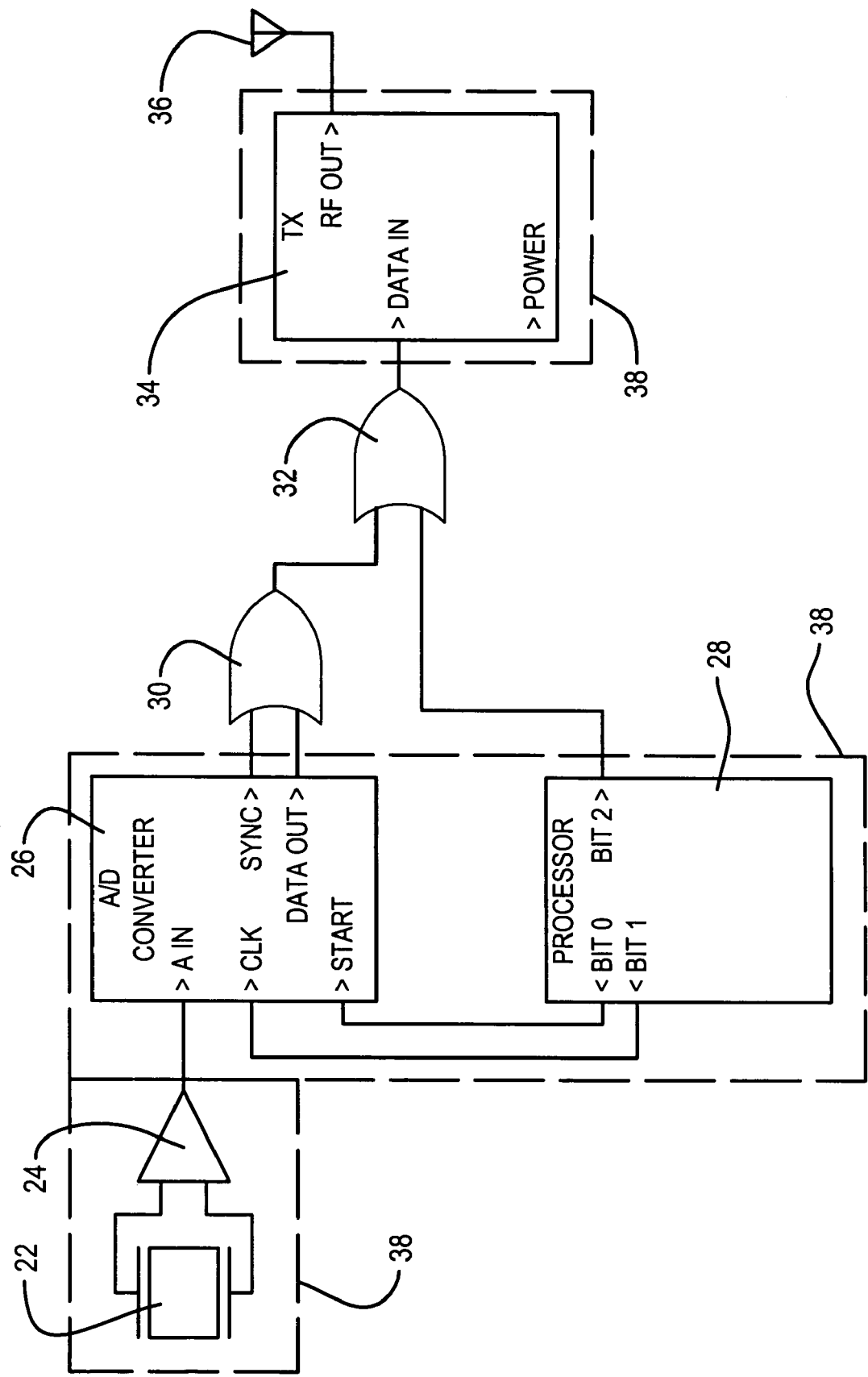
FIG. 2 is a schematic of the wireless hydrophone of the current invention.

In FIG. 2 there is shown a simplified schematic diagram of the wireless hydrophone of the current invention. The invention includes a hydrophone 22 joined to a preamplifier 24. Preamplifier 24 is implemented as a single-supply preamplifier preferably utilizing a rail-to-rail op amp device for maximum distortion-free signal swing. Preamplifier 24 output is joined to the analog input (A IN) of an analog-to-digital (A/D) converter 26. A/D converter 26 can be any analog-to-digital converter such as the Analog Devices AD977 or the like. A/D converter 26 has an analog input marked A IN, a clock input marked CLK and an initialization input marked START. Additionally, A/D converter 26 has a sync pulse output marked SYNC and a digital data output marked DATA OUT. A/D converter 26 is joined to be controlled by a processor 28.

Processor 28 can be any processor capable of controlling A/D converter 26 and at least one transmitter. In a preferred embodiment, processor 28 can be a microprocessor such as the Philips 87LPC764 which may be clocked up to 20 MHz allowing rapid switching. Processor 28 has an I/O port with lines marked BIT 0, BIT 1, and BIT 2. Processor 28 BIT 0 line is joined to the START input of A/D converter 26. Activation of BIT 0 line will cause A/D converter 26 to provide a sync pulse on its Sync output. The processor 28 BIT 1 line is joined to the clock input of the A/D converter 26 for clocking or strobing A/D converter 26 to sample data received at the A IN line from preamplifier 24.

A/D converter 26 is joined to a first OR gate 30. Sync output is joined to one input of OR gate 30 and DATA OUT line is joined to another input of OR gate 30. OR gate 30 provides an asserted output if either the Sync output or the DATA OUT line has an asserted output. A second OR gate 32 is joined to processor 28 BIT 2 line and first OR gate 30 output. Second OR gate 32 output is joined to a transmitter 34. Second OR gate 32 output is asserted when either the first OR gate output is asserted indicating a signal from the A/D converter 26 or when the BIT 2 line of processor 28 is asserted. Thus a variety of signal formats may be generated utilizing the processor as a control element and depending on the requirements for a start pulse, a longer synch pulse and different A/D formats.

Transmitter 34 marked TX is provided to transmit a serial digital radio signal on a predetermined frequency at an RF output connector. This transmitter 34 has a DATA IN line joined to second OR gate 32 output. Transmitter 34 can be any transmitter such as the Maxim 1472 transmitter chip. As an alternative, any modulation scheme can be used such as PSK (phase-shift keying) and FSK (frequency-shift keying). The predetermined frequency can be selected from 315 MHz, 433 MHz and 915 MHz because these are popular license-free bands. Other frequencies can also be used. Transmitter 32 RF output connector is joined to an antenna 36. The antenna used may be a simple patch antenna for the close-in propagation path in the configuration shown in FIG. 1. A simple stub (vertical ground plane) antenna that is embedded in the hull treatment can also be used.

There are some special precautions mandated by any circuit of this type. The preamplifier 24, A/D converter 26, and transmitter 34 must be well-shielded and isolated from each other in order to prevent cross-talk and "bleed-through." Shielding 38 is indicated by dashed lines. A/D converter 26 is especially vulnerable to noise pick-up, which would ruin most of its accuracy and resolution. Transmitter 34 must be prevented from radiating into the preamplifier 24 and A/D converter 26. Hydrophone 22 must also be shielded 38, and preamplifier 24 should be decoupled from the radio frequency energy. Processor 28 should have an internal clock circuit which will help minimize radiated radio frequency noise from this source.

Figure 3:
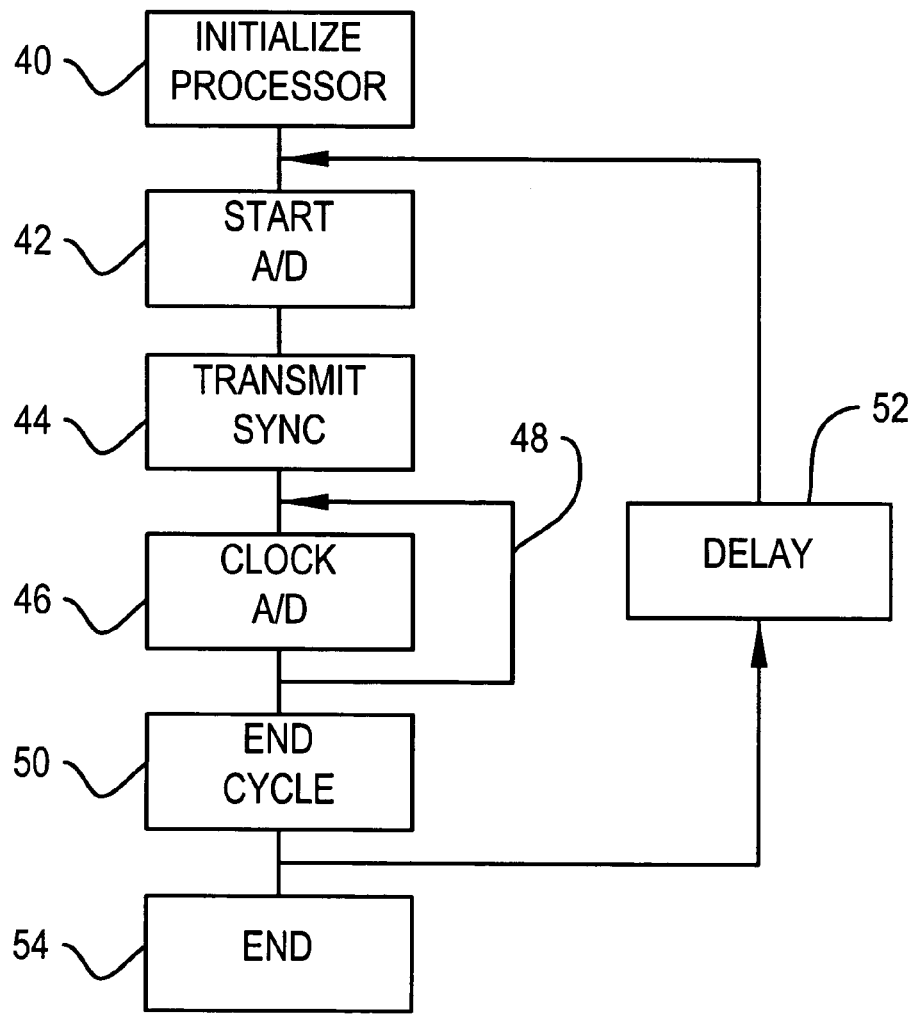
FIG. 3 is a flow chart of the code required to operate the processor of the current invention.

FIG. 3. shows a flow chart for the assembly code implemented on processor 28. In step 40 processor 28 is initialized. In step 42 a start signal is sent from BIT 0 line of the processor to the START line of A/D converter 26 to initialize converter 26. This causes A/D converter 26 to provide a sync pulse signal on Sync output in step 44. Processor 26 can add a start pulse, if necessary, by providing a BIT 2 output to second OR gate 32 during the appropriate time. The sync signal is transmitted by transmitter 34. In step 46 processor 28 provides a clock pulse on its BIT 1 line to strobe the A/D converter 26. Conventionally, one clock pulse is provided for each data bit of the A/D converter 26 as shown by loop 48. In end cycle step 50, processor 28 prepares to transmit the next sample for the A/D converter 26. After step 50, a delay loop 52 is used to time out the remainder of the sampling interval before beginning the next sample at the A/D converter 26. Control is thus transferred back to step 42.

The system disclosed provides a complete digital RF hydrophone telemetry system that can be greatly miniaturized. Power consumption may be tailored to the data throughput that is dictated by the hydrophone itself, with an optimized selection of the A/D converter and its corresponding transmitter. The circuit architecture is adaptable to virtually any type of modulation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A wireless hydrophone system comprising:
a hydrophone having an output;
a preamplifier joined to said hydrophone output for providing an amplified hydrophone output;
a serial A/D converter having an analog input, a sync output and a data out line whereby said sync output is capable of providing a sync signal, said serial A/D converter receiving the amplified hydrophone output and providing serial digitized data at the data out line;
a processor joined to control said serial A/D converter, said processor providing a start command to cause said serial A/D converter to provide the sync signal;
a transmitter having a data in line joined to said serial A/D converter sync output and said serial A/D converter data out line to transmit any provided signal, said transmitter further having an RF output connector capable of transmitting radio signals at a predetermined frequency; and
an antenna capable of transmitting radio signals at said predetermined frequency joined to said transmitter RF output connector.

2. The system of claim 1 wherein:
said A/D converter has a clock input for receiving an external clock signal; and
said processor has a Bit 1 line joined to said A/D converter clock input for providing a clock signal to said A/D converter.

3. The system of claim 1 further comprising:
transmitter shielding around said transmitter;
processor/converter shielding around said processor and A/D converter; and
hydrophone shielding around said hydrophone and preamplifier.

4. The system of claim 1 further comprising a first OR gate having a first input joined to said A/D converter sync output, a second input joined to said A/D converter data out line, and an output for providing composite waveform containing both the sync signal and the data signal, said first OR gate output being joined to said transmitter data in line.

5. The system of claim 4 further comprising a second OR gate having a first input joined to said first OR gate output, a second input joined to a processor Bit 2 line and an output for providing both said composite waveform and said processor Bit 2 line output to said transmitter whereby said processor can supply on optional start pulse.

6. A wireless sonar system for deployment on a hull of a vessel comprising:
- a hydrophone having an output;
- a preamplifier joined to said hydrophone output for providing an amplified hydrophone output;
- a serial A/D converter having an analog input, a sync output and a data out line whereby said sync output is capable of providing a sync signal, said serial A/D converter receiving the amplified hydrophone output and providing serial digitized data at the data out line;
- a processor joined to control said serial A/D converter, said processor providing a start command to cause said serial A/D converter to provide the sync signal;
- a transmitter having a data in line joined to said serial A/D converter sync output and said serial A/D converter data out line to transmit any provided signal, said transmitter further having an RF output connector capable of transmitting radio signals at a predetermined frequency;
- an antenna capable of transmitting radio signals at said predetermined frequency joined to said transmitter RF output connector; and
- a hull treatment providing a region for radio frequency propagation positioned on the hull and surrounding said hydrophone, said A/D converter, said transmitter, and said antenna.

7. The system of claim 6 wherein:
- said A/D converter has a clock input for receiving an external clock signal; and
- said processor has a Bit 1 line joined to said A/D converter clock input for providing a clock signal to said A/D converter.

8. The system of claim 6 further comprising:
transmitter shielding around said transmitter;
processor/converter shielding around said processor and A/D converter; and
hydrophone shielding around said hydrophone and preamplifier.

9. The system of claim 6 further comprising a first OR gate having a first input joined to said A/D converter sync output, a second input joined to said A/D converter data out line, and an output for providing composite waveform containing both the sync signal and the data signal, said first OR gate output being joined to said transmitter data in line.

10. The system of claim 9 further comprising a second OR gate having a first input joined to said first OR gate output, a second input joined to a processor Bit 2 line and an output for providing both said composite waveform and said processor Bit 2 line output to said transmitter whereby said processor can generate a separate start pulse.

\* \* \* \* \*